United States Patent [19]

Ghaem et al.

[11] Patent Number: 5,146,231
[45] Date of Patent: Sep. 8, 1992

[54] ELECTRONIC DIRECTION FINDER

[75] Inventors: Sanjar Ghaem, Palatine; George L. Lauro, Lake Zurich; Michael Barnea, Highland Park, all of Ill.

[73] Assignee: Motorola, Inc., Schaumburg, Ill.

[21] Appl. No.: 770,850

[22] Filed: Oct. 4, 1991

[51] Int. Cl.$^5$ .............................................. G01S 5/02
[52] U.S. Cl. ................... 342/419; 342/357; 342/439
[58] Field of Search ............... 342/419, 357, 356, 432, 342/439

[56] References Cited
U.S. PATENT DOCUMENTS

| 4,410,890 | 10/1983 | Davis et al. ............ | 342/419 |
| 4,754,280 | 6/1988 | Brown et al. ............ | 342/357 |
| 4,881,080 | 11/1989 | Jablonski ............... | 342/357 |
| 4,949,268 | 8/1990 | Nishikawa et al. ........ | 342/357 |

OTHER PUBLICATIONS

U.S. application filed Jun. 3, 1991, Ser. No. 07/710,197, Lauro et al., Title "Electronic Direction Finder".

Primary Examiner—Theodore M. Blum
Attorney, Agent, or Firm—Phillip H. Melamed

[57] ABSTRACT

An electronic direction finder (10), having a housing (11) with a major axis (18), has a GPS receiver (28) and directional (31) and omnidirectional (30) antennas and provides an electrical signal (angle A) indicative of the direction of the housing axis (18) with respect to a predetermined compass heading (North). The electrical signal (angle A) is provided by using determined positions of the GPS receiver (28) and one GPS satellite to calculate a compass bearing from the receiver (28) to the one satellite and using the directional antenna (31) to determine the orientation of the housing axis (18) with respect to the satellite. This eliminates using electrical output terrestrial magnetism sensing devices to sense direction finder/receiver orientation with respect to compass direction, and therefore avoids the inaccuracies and costs associated with such magnetism sensing devices.

20 Claims, 5 Drawing Sheets

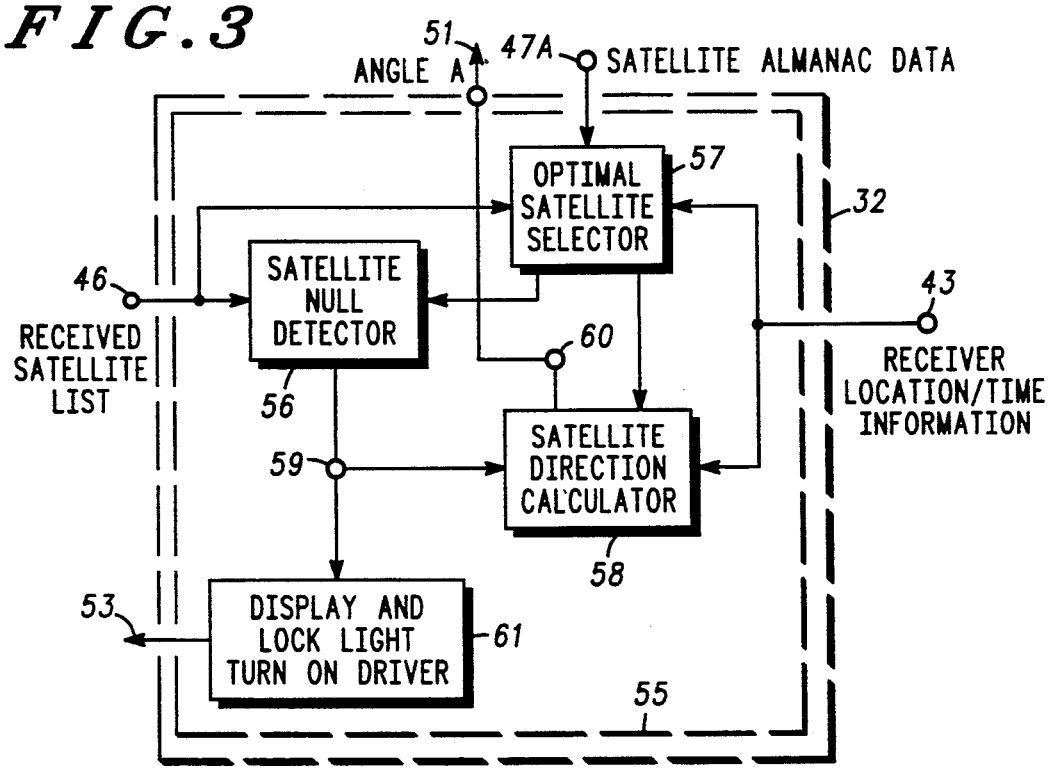
FIG.3
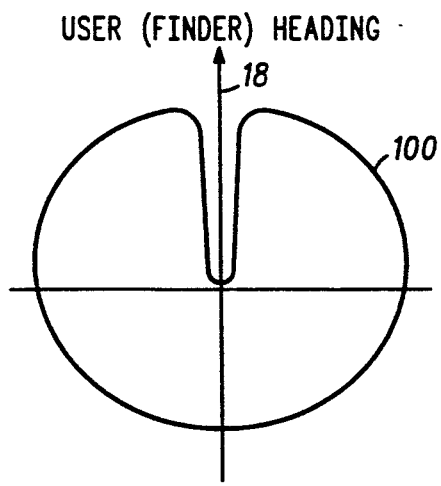
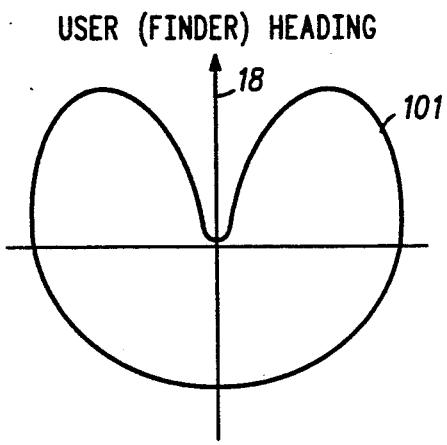
FIG.6

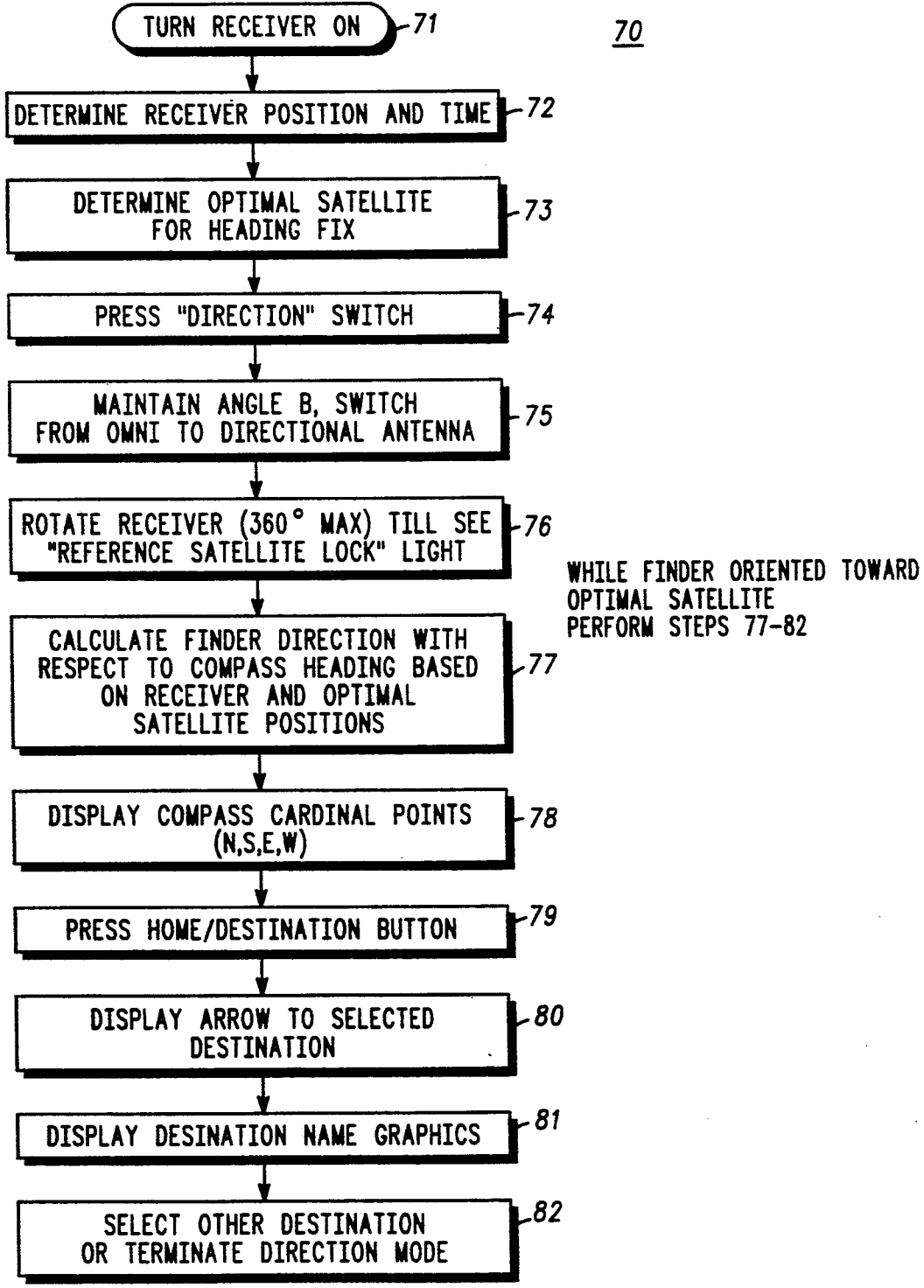

ELECTRONIC DIRECTION FINDER

CROSS REFERENCE TO RELATED APPLICATIONS

The present invention is related to the apparatus disclosed in copending U.S. Pat. application Ser. No. 7/710,197, filed Jun. 3, 1991 and entitled, "Electronic Direction Finder". The inventors of that copending U.S. application are George L. Lauro and Ralph E. Menick, and the application is assigned to same assignee as the present invention.

FIELD OF THE INVENTION

The present invention is generally directed to the field of electronic direction finders in which bearing/heading information is provided to a user with respect to the user's present heading and/or with respect to the heading which a user should follow to arrive at a desired destination.

BACKGROUND OF THE INVENTION

Conventionally, magnetic compasses are used to sense terrestrial magnetism and provide a visual indication identifying at least one predetermined compass heading such as north, south, east or west. Recently, magnetic flux gate compasses have been utilized to sense terrestrial magnetism and to provide an electronic signal which identifies the predetermined compass direction. Because these devices operate in response to sensed terrestrial magnetism, they are somewhat inaccurate since they are subject to local disturbances and variations of the earth's magnetic field. In addition, the magnetic north sensed by such sensors does not, in general, correspond to the true north compass direction and therefore correction or calibration of the compass output may be required if accurate compass headings are to be achieved.

The electronic direction finder described in the above noted copending U.S. patent application utilizes a flux gate compass to provide an electronic signal indicative of the orientation of a global positioning system (GPS) receiver, and its visual display, with respect to a predetermined compass heading such as north. A signal is also generated which determines, which respect to predetermined compass directions, the direction, from the receiver, of a desired destination. The prior direction finder then provides on its display a rotatable pointer which provides a visual indication of the bearing towards a selected desired destination. The sensing of terrestrial magnetism by the flux gate compass determines the orientation of the GPS receiver with respect to compass directions and ensures the proper orientation of the displayed visual arrow to the desired destination.

The electronic direction finder described in the above identified copending U.S. patent application represents a substantial improvement over other direction finders currently available. It is contemplated that such a direction finder will be of a size so as to be hand holdable and therefore represent a portable navigation device usable by hikers and other pedestrians as well as usable by boaters. However, terrestrial magnetism sensors such as flux gate compasses are relatively expensive and their cost therefore might prevent the widespread adoption and commercial success of such a hand held GPS receiver. Also, the flux gate compass and its associated circuitry appreciably adds to the total size of a hand held GPS receiver when included therewith. In addition, sensing of terrestrial magnetism would also require calibration to correct for known variations of the earth's magnetic field. Also, such a system would be susceptible to errors in sensed magnetic field cause by local disturbances of the earth's magnetic field.

Thus there is a need for an electronic direction finder apparatus which is relatively inexpensive and small in size and does not utilize a flux gate compass or any sensing of terrestrial magnetism in order to produce an accurate visual display of compass directions and/or the direction to a desired destination.

Some prior direction systems rigidly mount two widely spaced omnidirectional antennas on a vehicle, such as a ship, and calculate the direction of the vehicle heading by calculating the position of each fixed antenna location. This is not practical for a small hand held direction finder device.

SUMMARY OF THE INVENTION

In one embodiment of the present invention, an electronic direction finder is provided. The electronic direction finder includes a housing having a major axis; an omnidirectional antenna for receiving signals from at least three satellites; a navigation receiver fixed within the housing and coupled to the omnidirectional antenna for receiving the satellite signals therefrom and in response thereto determining the position of the receiver and also determining the position at least one of the satellites; directional antenna means, having a directional antenna pattern, fixed to and rotatable with the navigation receiver for also providing the satellite signals to the receiver; direction means for determining when the directional antenna pattern is oriented at a predetermined direction with respect to the at least one satellite; and means for providing an electrical signal indicative of the direction of the housing axis with respect to at least one predetermined compass heading when the directional antenna pattern is oriented at the predetermined direction by using the determined positions of the at least one satellite and of the receiver to calculate a bearing from the receiver to the at least one satellite.

Preferably, the navigation receiver comprises a GPS receiver, the directional antenna means implements a directional antenna pattern having a single narrow band null and the electronic direction finder includes a display for providing a visual indication of the orientation of the housing axis with respect to the predetermined compass heading. In addition, preferably the electronic direction finder also includes means for generating a destination direction signal indicative of a bearing from the position of the receiver toward a desired destination, and the display, in accordance with the destination direction signal, provides a visible image of a pointer which points in the direction of the desired destination.

BRIEF DESCRIPTION OF THE DRAWINGS

The present invention can be better understood by reference to the drawings in which:

FIG. 3 is a more detailed schematic block diagram of one portion of the direction finder shown in FIG. 2;

FIG. 5 is a flowchart illustrating the operation of the direction finder shown in FIGS. 1 and 2; and FIG. 6 illustrates two possible directional antenna patterns which may be provided by a directional antenna shown in FIG. 2.

DESCRIPTION OF THE PREFERRED EMBODIMENTS

Figure 1:
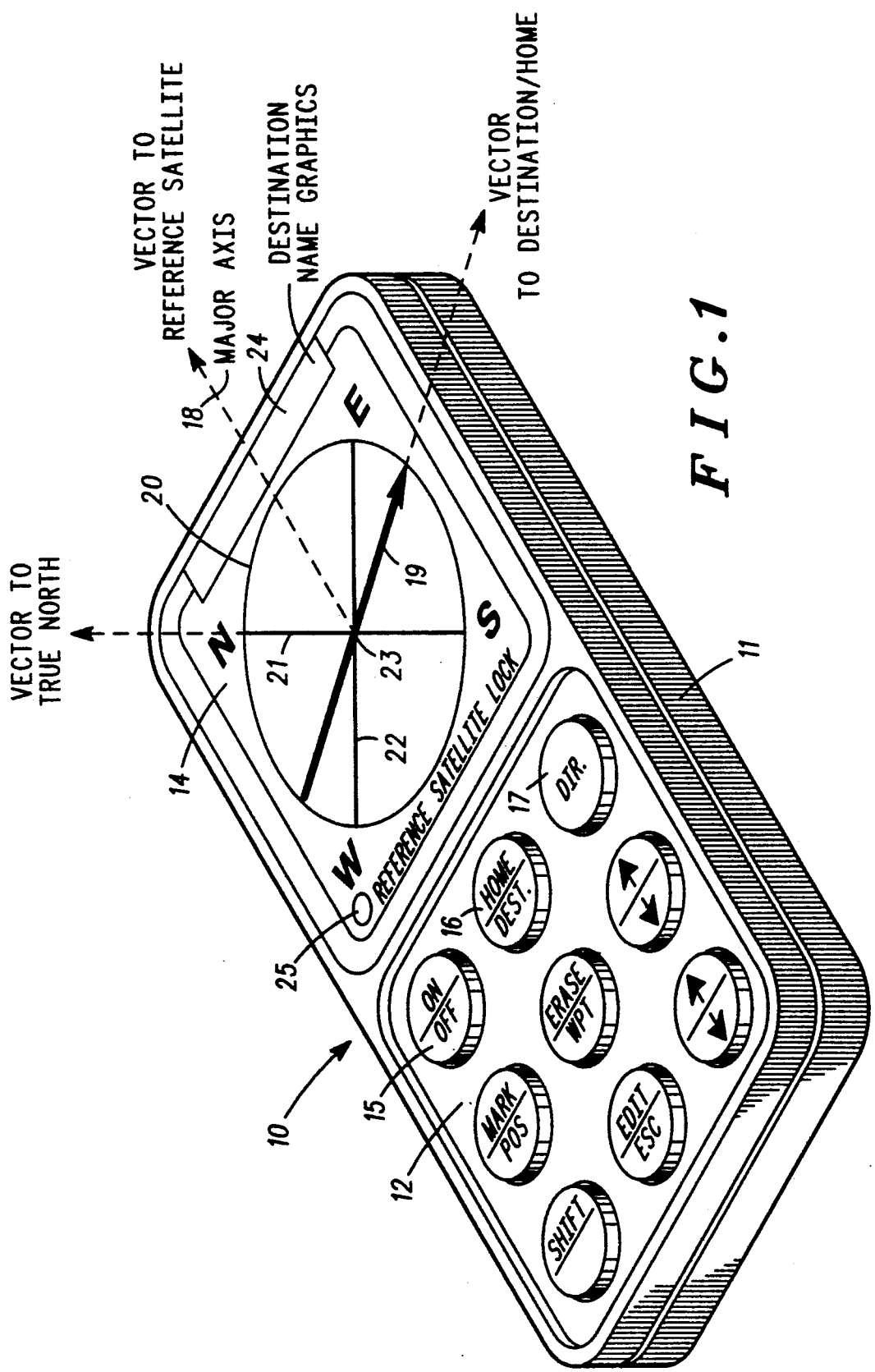
FIG. 1. is a perspective view of a portable direction finder constructed according to the present invention.

Referring to FIG. 1, a hand held portable direction finder 10 is shown whose housing 11 contains a keypad 12 and a visual display 14. The keypad 12 allows a user to input data regarding the latitude and longitude of the user's present position and the latitude and longitude of desired destinations (sometimes also referred to as waypoints). The keypad also enables the user to define as "HOME" a specific desired destination, which may correspond to the user's present position. The keypad includes a push button 15 that controls the on/off function of the portable direction finder 10 and a push button 16 by which a user may command the direction finder to generate an arrow to point in the direction of either "HOME" or some other specific desired destination. The keypad 12 includes a push button 17 labeled DIR. which corresponds to a direction push button that places the portable direction finder 10 in a direction finding mode. In the direction finding mode, the finder 10 provides a visual display indicative of the direction of a major axis 18 of the direction finder housing 11 with respect to a predetermined compass heading, such as true north. The term "compass heading" is used herein to indicate the navigational direction headings generally provided by a compass. However, the direction finder 10 is not contemplated as including a magnetic or flux gate compass or any other type of device which senses terrestrial magnetism to provide an electrical signal or a visual display indicative of compass headings. Other functions which are not especially pertinent to the basic functions of the finder 10 may also be actuated by the keypad 12.

If desired, a permanent graphic indication of the major axis 18 can be applied to the housing 11, such as by printing an arrow on the display 14 or by notching the housing. However, due to a preferred rectangular shape for the housing 11, this may not be necessary and no such permanent graphic indication is shown in FIG. 1. Fixed within the direction finder 10 is a navigation receiver and other circuits which will be discussed more fully below. These components enable the direction finder 10 to provide a visual arrow indication pointing towards either home or towards any other desired destination as selected by the push button 16.

Referring now to the display 14, this display generates an image of a pointer 19 which preferably is illustrated in the form of an arrow and which will point towards a desired destination, selected by the user, with respect to the user's heading. The term "user's heading" is considered herein to be a direction parallel to the major axis 18 of the direction finder housing 11. Thus, with the user facing in the direction of the axis 18, the pointer 19 shown in FIG. 1 clearly indicates that the user should turn to the right approximately 75° in order to be heading towards a desired destination. If the user is facing directly towards the desired destination the pointer 19 will point directly along the axis 18. In such a pointing system the user does not need to be familiar with compass or navigation terminology in order to determine the direction of a route towards the desired destination.

The display 14 also generates the image of a compass card which indicates at least one compass point or predetermined compass heading such as north (N). In the illustrated embodiment, the compass card includes a circle 20, the compass points N, S, E and W, and a pair of orthogonal line segments 21 and 22 connecting to N to S and E to W, respectively. In response to circuitry within the direction finder 10, the image of the compass card rotates around a center point 23 of the circle 20 so that the compass point N and the line segment 21 line up with the predetermined compass heading of true north. The location of the visual compass point N is indicative of the difference between the direction of true north and the housing axis 18. This arrangement provides the user not only with the easy to read pointer 19, but also with a visual compass display to provide additional navigation information. Because the pointer 19 is overlayed on the image of the compass card, and because the pointer 19 is also rotatable about the card's center 23, the compass heading of the desired destination can be read directly from the display.

It should be noted that the complexity of the compass card visual display may be modified to provide any desired degree of resolution. For example, only a single compass point N and the orthogonal line segments 21 and 22 could be illustrated if less resolution is required, whereas additional compass points may be added along with additional axes corresponding to additional line segments if greater resolution is required.

With the exception of the push buttons 16 and 17, what is shown in FIG. 1 and explained above directly corresponds to the electronic direction finder described in copending U.S. patent application Ser. No. 07/710,197, filed Jun. 3, 1991, to George L. Lauro and Ralph E. Menick entitled, "Electronic Direction Finder" and assigned to the same assignee as the present invention. That copending U.S. application describes circuitry within the direction finder which produces the above described displays through the use of a magnetic flux gate compass which senses the earth's magnetic field to provide information regarding the orientation of the major axis 18 with respect to true compass north direction. Because the copending application describes details of the production of such a visual display the entire contents of that application is hereby incorporated by reference so as to minimize the amount of invention description provided herein.

Essentially, the present invention is directed to an improved direction finder in which the need for a flux gate compass or other type of magnetic field sensing compass is eliminated. This reduces the cost of the electronic direction finder, enhances its accuracy by avoiding errors due to local magnetic field disturbances and variations and results in a reduction in size for the direction finder since space does not have to be provided for the flux gate compass. All this is achieved by operation of the circuitry within the direction finder 10 wherein this circuitry is illustrated in FIG. 2 and will be subsequently described.

Figure 2:
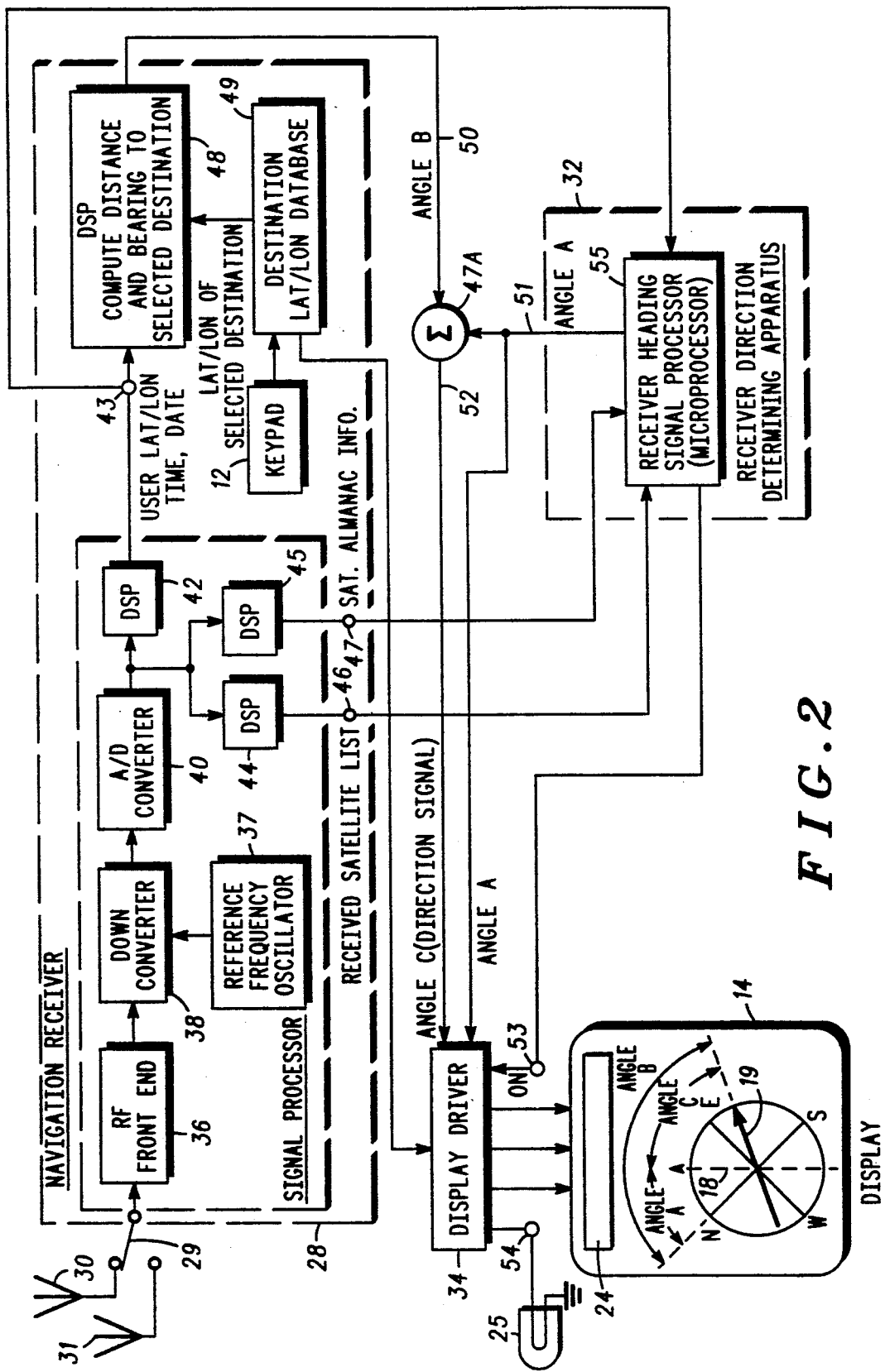
FIG. 2 is a schematic block diagram of the direction finder shown in FIG. 1.

Before reciting the detailed operation of the circuitry within the direction finder 10 with regard to FIG. 2, it should be noted that FIG. 1 also illustrates, as part of the visual display 14, a display portion 24 which will identify the destination to which the pointer 19 will point. Thus the display portion 24 may comprise destination name graphics such as "HOME" or other terminology identifying the name of a particular destination and/or it may display the latitude and longitude of a specific destination. In addition, the display 14 includes an indicator light 25 adjacent which is the graphic label "REFERENCE SATELLITE LOCK". When the portable direction finder 10 shown in FIG. 1 is oriented such that it can produce an appropriate visual display 14, then indicator light 25 will be actuated so as to provide an indication that the finder 10 can now provide desired pointer arrows to destinations, such as arrow 19, as well as providing an indication of compass headings with respect to the major axis 18 of the direction finder housing. All this will be explained in connection with the operation of the circuitry shown in FIG. 2 which will now be described.

Referring to FIG. 2, the major components of the direction finder 10 comprise the display 14, a navigation receiver 28 fixed within the housing 11 and coupled via a selector switch 29 to either an omnidirectional receiving antenna 30 or a directional receiving antenna 31, a receiver direction determining apparatus 32 and a display driver 34. Generally speaking, the navigation receiver 28 and the receiver direction determining apparatus 32 generate signals that are combined so as to generate a "direction signal". This direction signal is indicative of a bearing towards a desired destination of the user, and the bearing is relative to the user's heading which corresponds to the orientation of the major axis 18 of the direction finder 10. The major axis of the housing 11 coincides with and is sometimes also referred to herein as the major axis of the finder 10. The "direction signal", which in FIG. 2 is identified as angle C, is applied to the display driver 34 which causes the display 14 to generate the image of the rotatable pointer 19 overlayed on the image of a compass card and to cause the pointer 19 to point in the direction of the desired destination.

Referring now to the navigation receiver 28, this preferably is a GPS receiver which may be of conventional construction. Preferably the GPS receiver 28 has a signal processing section that includes an RF front end 36 connected to a down converter mixer 38 which receives a reference frequency signal from an oscillator 37. The output from the down converter 38 is applied to an A/D (analog to digital) converter 40 and from there to a DSP (digital signal processor) 42. The DSP 42 provides an output signal at an output terminal 43 indicative of the user's latitude and longitude which therefore is indicative of the location of the direction finder 10. The time and date are also customarily provided as part of the output of the DSP 42 and are so indicated in FIG. 2. Conventional GPS receivers all have a digital signal processor corresponding to the DSP 42 which provides the receiver location, time and date signals provided at the terminal 43.

In addition, the GPS receiver 28 includes additional digital signal processors (DPSs) 44 and 45 connected to the output of the A/D converter 40. The DSP 44 provides at a terminal 46 information identifying all of the global positioning satellites which are transmitting signals currently being received by the GPS receiver 28. The DSP 45 provides location information about every GPS satellite at an output terminal 47 which information is conventionally termed "Satellite Almanac Information". This Satellite Almanac Information comprises equations which, when combined with actual time of day, exactly define the location of every GPS satellite.

The DSPs 44 and 45 are conventional and are present in every GPS receiver. The GPS satellites repetitively broadcast the satellite almanac equations and that is how the DSP 45 provides this information at the terminal 47. In addition, each GPS satellite broadcasts information identifying its transmitted signals as being transmitted by a specific one of the GPS satellites. In order for the DSP 42 to determine the location of the GPS receiver it compares signals it receives from each one of at least three different GPS satellites and therefore the navigation receiver 28 knows the identity of each transmitting satellite which it is receiving signals from. Therefore the DSP 44 merely provides a list of all of these satellites which are currently sending signals received by the receiver 28, and this is the information provided at terminal 46.

The GPS navigation receiver 28 includes another conventional DSP 48 which receives two inputs, one from the DSP 42 (terminal 43) and a second input from a database 49 that contains the latitudes and longitudes of various waypoints or destinations, as input by the user via the keypad 12. Operating conventionally, the DSP 48 uses those inputs to compute the distance and the bearing, with respect to a compass direction such as north, to the destination selected by the user. The computed bearing to the destination is provided on lead 50 as a signal angle B. The signal angle B is generally indicated on the display 14 as shown in FIG. 2, and angle B represents the bearing angle, relative to due north, to the location of the desired destination. Angle B is not used directly to provide the pointer 19. Instead, it is applied as one input to a conventional combining circuit 47, the other input to which is developed by the receiver direction determining apparatus 32.

Preferably the receiver direction determining apparatus 32 replaces the flux gate compass shown in the above referred to copending U.S. patent application. Because of this, the direction finder 10 described herein is smaller, less expensive and less subject to error than the direction finder described in the previously noted copending U.S. patent application. The basic function of the receiver direction determining apparatus 32 is to provide a direction angle A signal which is indicative of the orientation of the direction finder 10 (more specifically the orientation of the major axis 18 of the direction finder housing 11) with respect to true north compass direction. Angle A is generally indicated on the display 14 shown in FIG. 2.

The providing of angle A is achieved in the finder 10 without the use of a flux gate compass and in fact without the use of any terrestrial magnetism sensing apparatus. Because of this, there is no need to correct a sensed angle A due to known variations in the earth's magnetic field and there is no way that local unknown disturbances in the earth's magnetic field can affect the accuracy of the angle A. In the prior direction finder, a local disturbance of the magnetic field of the earth, such as the presence of the side panel of a large truck next to the direction finder or the presence of magnetic rocks on the ground located near the direction finder, could cause a substantial error. This is not the case with regard to the present receiver direction determining apparatus 32. Also, the use of a magnetic field sensor in prior direction finders required the use of a magnetic anomaly correction circuit to correct for known variations in the Earth's magnetic field, and such a correction circuit is not needed if receiver direction is derived without sensing terrestrial magnetism. The detailed operation of the receiver direction determining apparatus 32 will be described subsequently.

To develop the signal angle C which represents the direction of the desired destination with respect to the user's heading, the output of the receiver direction determining apparatus, comprising the angle A, is provided on a lead 51 which is connected as a second input to the combining circuit 47. The angle A signal is also provided as an input to the display driver 34. The combining circuit 47 functions such that angle A is subtracted from angle B to produce angle C on a lead 52. The signal representing angle C is the "direction signal" that causes the pointer 19 to point in the direction of the user's desired destination. The relationship between the angles A, B and C is best shown in FIG. 2 with regard to its illustration of the display 14. From this display illustration it is clear that angle A represents the orientation of the major axis 18 of the finder housing 11 with regard to the true compass direction north and angle B represents the calculated bearing of the desired destination with regard to the true compass direction north. Angle C, which is the difference of angles B and A, represents the direction of the desired destination with respect to the major axis 18 of the direction finder housing 11.

Referring now to the display driver 34, this includes conventional circuitry, such as logic circuitry and/or a microprocessor, for driving the display 14 and for using the signals representing the angles A and C to activate appropriate portions of the display 14. The above noted copending U.S. application explains in detail how a display driver, such a the driver 34, can provide suitable visual displays so as to implement all of the displays discussed above. Therefore, substantial discussion of the operation of the display driver 34 will not be provided herein. However, it should be noted that the display driver 34 is only activated when it receives an ON signal at an input terminal 53 wherein the receiver direction determining apparatus 32 provides such a signal. In addition, the display driver, besides providing the visual displays indicated by the display 14 shown in FIG. 2, also provides at an output terminal 54 an excitation signal, which essentially corresponds to the signal at the terminal 53, and this results in illuminating the reference satellite lock lamp 25 shown in FIGS. 1 and 2. It should be noted that the lamp 25 may also be considered as part of the display 14.

Referring now to FIG. 3, the operation of the receiver direction determining apparatus 32 will now be described with respect as to how this apparatus enables the direction finder 10 to produce an electrical signal (angle A) on line 51 indicative of the predetermined direction the finder housing axis 18 with respect to the predetermined compass heading of north. This occurs by the receiver direction determining apparatus 32 using the predetermined positions of at least one satellite and of the receiver 28 to calculate a bearing, with respect to true north, from the receiver to the one satellite. This results in the creation of the angle A signal provided on line 51 when the major axis 18 is aligned in the direction of the predetermined one of the satellites which transmitted GPS information to the receiver 28. The receiver direction determining apparatus 32 essentially comprises a receiver heading circuit or signal processing microprocessor 55. FIG. 3 represents in block form the basic functions of that circuit or the basic functional programming of a microprocessor which implements those functions.

Referring to FIG. 3, the information at terminal 46, which comprises a list of all satellites having GPS signals being received by the GPS receiver 28, is provided to both a satellite null detector 56 and an optimal satellite selector 57. The optimal selector 57 also receives as an input the satellite almanac equation data provided at the terminal 47. The optimal satellite selector 57 also receives from the terminal 43 information as to the location of the GPS receiver and the current time. Based on all of these inputs provided to the optimal satellite selector 57, this component selects as an optimal satellite one satellite close to the horizon as viewed from the GPS receiver location but a few degrees, such as 10, above the horizon wherein the selected satellite is one of the satellites currently transmitting GPS information to the GPS receiver. The calculations provided by the optimal satellite selector are possible because the received almanac data identifies, in conjunction with the current time of day provided at the terminal 43, the location of every satellite. The information at the terminal 46 identifies those satellites that are currently being received by the receiver 28 and therefore this narrows down the list of possible satellites to be selected. Other criteria also may be utilized in selecting the optimal satellite if two satellites are identified as having the same approximate azimuth height above the horizon, such as selecting as the optimal satellite the one of these two satellites which transmits the largest strength signal to the receiver 28. Information identifying which satellite has been selected as the optimal satellite by the selector 57 is provided to both the satellite null detector 56 and a satellite direction calculator 58. The satellite direction calculator 58 also receives an input from the terminal 43 which defines the location of the receiver 28 and the time of day.

Essentially, the satellite null detector 56 receives a list from terminal 46 of all satellites currently transmitting GPS signals received by the navigation receiver 28. It also receives identification information as to the specific one optimal satellite selected by the optimal satellite selector 57. Whenever the satellite null detector 56 determines that the selected satellite identified by the selector 57 is no longer one of the satellites transmitting signals that are received by the receiver 28, it will produce a null detection signal at an output terminal 59 and this is provided as an input to the satellite direction calculator 58. In response to this null detection, the satellite direction calculator 58 will calculate the direction, with respect to true north, between the receiver location and the location of the optimal satellite selected by the selector 57 and provide this bearing data as an output (angle A) at a terminal 60.

The signal at terminal 60 will correspond to the angle A that represents the angle between true north and the axis 18 of the direction finder housing 11. This is because the satellite null detector will produce a null indication when the switch 29 is switched from its omnidirectional antenna 30 to its directional antenna 31 and the directional antenna pattern of the directional antenna 31 will be positioned such that it has a null directed towards the low horizon satellite selected by the optimal satellite selector 57. At the same time that the satellite null detector 56 activates the satellite direction calculator 58, the satellite null detector 56 will also actuate a display and lock light turn-on driver 61 that provides the turn-on signal to the terminal 53 to actuate the display driver 34. These operations are perhaps best understood by reference to the overall flowchart shown in FIG. 5 and the directional antenna patterns shown in FIG. 6.

Referring to FIG. 5, an overall flowchart 70 of the operation of the direction finder 10 is illustrated. The flowchart begins at a receiver turn-on step 71 corresponding to actuation of the push button 15 which provides power to the GPS receiver 28. With power applied to the receiver 28, initially the switch 29 is connected such that the omnidirectional antenna 30 is connected to the GPS receiver. Thus the receiver 28 receives GPS signals from all satellites which are operational and able to transmit signals to the receiver 28 based on the position of the satellites and the position of the receiver. From block 71, process flow continues to block 72 which determines the navigation receiver position and the time of day. This corresponds to the operation of the DSP 42 which, as is the case in conventional GPS receivers, receives signals from a plurality of at least three GPS satellites and in response thereto provides a signal indicative of the position of the receiver and also provides a time of day signal wherein these signals are provided at the terminal 43 in FIG. 2. After process block 72, control proceeds to process block 73 by which the optimal satellite selector 57 will select one of the satellites transmitting signals to the navigation receiver 28 as an optimal satellite wherein this optimal satellite will be utilized for providing a heading fix for the direction finder 10.

After the process block 73, control passes to a process block 74 which corresponds to the user of the direction finder 10 pressing the direction button 17. This causes the receiver 28 to enter into a direction finder mode. After block 74, as part of the direction finder mode, a process block 75 stores and maintains angle B provided by the DSP 48 and the block 75 switches the RF front end 36 of the GPS receiver from the omnidirectional antenna 30 to the directional antenna 31 via movement of the switch 29.

Referring now to FIG. 6, two somewhat different directional antenna patterns are shown as patterns 100 and 101 each of which representing a single narrow band null antenna pattern with the single narrow band null generally corresponding to the major axis 18 of the direction finder housing 11. Pattern 100 is drawn basically as a completely omnidirectional pattern except for a single very narrow band null which is coincident with the axis 18, whereas pattern 101 has more of a cardioid shape also with single narrow band null coinciding with the axis 18 of the direction finder housing 11. Either of these two antenna patterns can be provided for the directional antenna 31 by conventional directional antenna construction. It should be noted that the directional antenna 31 is contemplated as being fixed to and rotatable with the navigation receiver 28 such that any change in the orientation of the directional antenna 31 and its antenna pattern (100 or 101) corresponds to an identical change in the orientation of the direction finder 10 and the major axis 18.

Referring again to FIG. 5, after the process step 75, control passes to a process step 76 which corresponds to the user rotating the receiver 28 (comprising the direction finder 10) up to a maximum of 360° along the horizon until the user will note that the reference satellite lock light is actuated. This corresponds to the GPS receiver 28 receiving all prior received GPS satellite signals except for satellite signals from the optimal selected satellite which is now directly in-line with the major axis 18 of the direction finder housing. When the direction finder 10 points the major axis 18, coinciding with a directional antenna pattern null, towards the selected optimal satellite, the display and lock light turn-on driver 61 will result in actuating the lamp 25 indicating that the direction finder axis 18 is pointing towards the known selected satellite. Substantially at the same time, the process block 77 in FIG. 5 will calculate the direction finder housing axis 18 direction with respect to a predetermined compass heading based on the known receiver and optimal satellite positions. This is accomplished by the satellite direction calculator 58 which operates in a manner similar to the conventional DSP 48 that computes a bearing direction from the receiver to a selected destination with respect to true north based on the position of the receiver and the position of the selected destination. The only difference with regard to the operation of the satellite direction calculator 58 shown in FIG. 3 is that now the selected destination is the location of the optimal selected satellite. The location of the optimal satellite is known based on the GPS almanac information which is always transmitted to the GPS receiver and defines the positions of all of the GPS satellites at any known time.

After the process block 77 control passes to process block 78 which corresponds to the display 14 providing a visual display of the cardinal compass points such as north, south, east and west, as shown in FIG. 2, with respect to the axis 18. With just this display the user now can identify the direction of true north just based on the visual display 14 provided by the direction finder 10. In order for this step and all the subsequent steps in the flowchart 70 to be accurate, this will only occur when the direction finder 10 and GPS receiver 28 are maintained with respect to their orientation towards the optimal selected satellite. If this orientation is not maintained, the satellite null detector 56 will no longer provide a null detection signal at the terminal 59 and therefore the display driver 61 will no longer provide an on signal at the terminal 53 actuating the display 14 and the lamp 25. In other words, after satellite lock is obtained, the display 14 will only be correct when the axis 18 of the finder 10 is maintained at its prior lock direction orientation. It is assumed that the latitude and longitude position of the finder 10 is maintained after block 74 to insure no changes to angle B.

After the process block 78, control passes to a process block 79 which allows the user to press the home/destination button 16 when he desires the creation of a vector pointer towards a desired destination, such as HOME or some other destination the location of which has been input into the direction finder 10. After step 79, and assuming that push button 16 has been actuated, control passes to a process block 80 which results in displaying an arrow on the display 14 directed towards the desired destination wherein this arrow corresponds to the arrow 19. At the same time, a process block 81 represents the display portion 24 displaying the name and/or latitude and longitude of the destination to which the arrow 19 is pointing. A final process block 82 indicates that the user may now select other destinations and have a visual display representing the direction to that destination and the name of that destination provided or he may then terminate the direction mode preferably by again actuating the direction push button 17 so as to return the navigation receiver 28 to its omnidirectional antenna and terminate the satellite null detection provided by the satellite null detector 56.

A review of the preceding description reveals that the direction finder 10 functions by utilizing a directional antenna pattern to determine when a major axis of the direction finder housing is orientated at a single predetermined direction with respect to one selected GPS satellite. Then an electrical signal corresponding to the angle A is provided which is indicative of the predetermined direction of the finder housing axis with respect to a predetermined compass heading such as north. The angle A signal is provided by using the determined positions of the selected satellite and the direction finder to calculate the bearing from the the finder 10 to the selected satellite. Preferably the directional antenna pattern 100 or 101 has one narrow band null, and preferably the entire navigation receiver and direction finder 10 is dimensioned so as to be hand holdable. The display 14 and lamp 25 preferably provide a visual indication of when the receiver 28 and finder 10 are oriented at a predetermined direction with respect to the selected satellite. Note that the detection of a loss of a GPS signal by use of a directional antenna pattern having a narrow band null is preferable to the detection of reception of a GPS signal on a high gain narrow band directional antenna pattern. This is because detecting reception of a GPS signal would require a signal lock up time which is not needed to detect a loss of GPS signal. Thus null detection is preferred for the direction determining apparatus 32.

While in the preceding description it is noted that the finder 10 axis 18 coincides with a single null in the directional antenna pattern 100 or 101, obviously as long as any angular difference between the null and the axis is fixed and known, the magnitude of the angle A signal can be corrected to compensate for any such fixed offset. Also, in addition to providing a visual display for the finder housing that indicates true compass direction with respect to the axis 18 of the direction finder 10, clearly the present apparatus can also be used in conjunction with generating at least one destination direction signal indicative of a bearing, with respect to the axis 18, from the position of the receiver towards a desired destination, and the display 14 can provide a visual display, such as the pointer 19, so as to point in the direction of the desired destination. By means of the push button 16, clearly a user can select any one of a plurality of destinations to which the visual pointer 19 will point at, and the rest of the keyboard 12 enables the user to enter data defining the location of such desired destinations since most prior GPS receivers which are part of navigation systems allows the user entry of a plurality of different desired destinations or waypoints. All this is achieved without the use of a flux gate compass or any other terrestrial magnetism sensing apparatus because of the use of the locations of the GPS receiver and a selected satellite in conjunction with the use of a directional antenna. Thus the cost of a magnetic sensing device and the cost of correcting the inherent anomalies provided by such a magnetic sensing device, when such anomalies are correctable, is avoided and a much more accurate and less expensive direction finder is provided.

Figure 4:
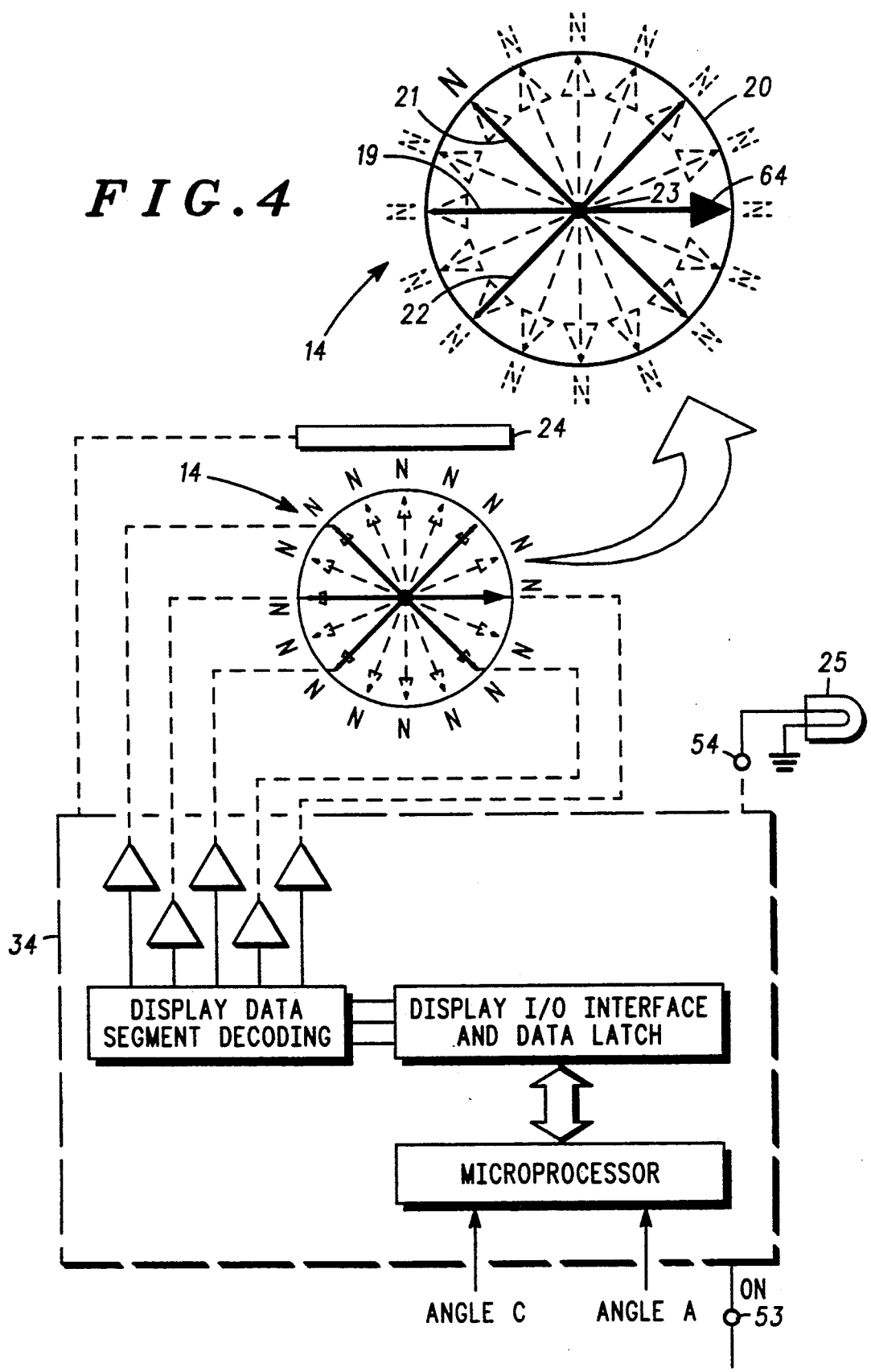
FIG. 4 is a schematic diagram which illustrates details of a display driver shown in FIG. 2 and its associated resultant visual displays.

Note that there is no detailed description of the apparatus shown in FIG. 4 since the above noted copending U.S. patent application fully explains how a display driver such as the display driver 34 in FIG. 4 is utilized to produce a display similar to display 14, except for the following. The present display driver 34 is turned on via the input from terminal 53, and the lighting of the lamp 25 is directly in response to the excitation signal at the terminal 54 which directly corresponds to the signal at the terminal 53. Clearly this requires no additional explanation. In addition, the present display driver 34 provides a visual indication of the name of a selected destination on the display portion 24. The providing of a graphic indication on display portion 24 identifying the name of the selected destination to which the pointer 19 will point is also conventional since any display driver, such as the driver 34, can produce such a visual indication by utilizing techniques as are conventionally used in display monitors. The information as to the name of the destination to be displayed in the portion 24 is provided by the destination database 49 which, in addition to supplying the latitude and longitude information to the DSP 48, also supplies destination name information and/or destination latitude and longitude information to the display driver 34. This connection is shown in FIG. 2.

While we have shown and described specific embodiments of this invention, further modifications and improvements will occur to those skilled in the art. One such modification could be to use different known phasing between fixed antenna elements mounted on the finder 10 to control the generation and automatic sweeping of a directional antenna pattern having a null. The automatic sweeping would cease when the null was pointing at the selected satellite, and the known phasing would determine the angular offset between the axis 18 and the direction of the null. This offset would be used to provide a corrected angle A. All such modifications which retain the basic underlying principles disclosed and claimed herein are within the scope of this invention.

What is claimed is:

1. Electronic direction finder comprising:
   a housing having a major axis;
   an omnidirectional antenna for receiving signals from at least three satellites;
   navigation receiver fixed within said housing and coupled to said omnidirectional antenna for receiving said satellite signals from said omnidirectional antenna and in response thereto determining the position of the receiver and also determining the position of at least one of the satellites;
   directional antenna means, having a directional antenna pattern, fixed to and rotatable with said navigation receiver for also providing said satellite signals to said receiver;
   direction means for determining when said directional antenna pattern is oriented at a predetermined direction with respect to said at least one satellite; and
   means for providing an electrical signal indicative of the direction of said housing axis with respect to at least one predetermined compass heading when said directional antenna pattern is oriented at said predetermined direction by using the determined positions of said at least one satellite and of said receiver to calculate a bearing from said receiver to said at least one satellite.

2. Electronic direction finder according to claim 1 wherein said directional antenna pattern has at least one narrow band null and wherein said direction means determines when said narrow band null is directed towards said at least one satellite.

3. Electronic direction finder according to claim 2 wherein said navigation receiver and housing are dimensioned so as to be hand holdable.

4. Electronic direction finder according to claim 2 which includes display means coupled to said navigation receiver for providing a visual indication indicative of when said directional antenna pattern is oriented at said predetermined direction with respect to said at least one satellite.

5. Electronic direction finder according to claim 4 wherein said display means also includes means for providing, in accordance with said electrical signal, a visual indication of the orientation of said housing axis with respect to said one predetermined compass heading.

6. Electronic direction finder according to claim 5 wherein said navigation receiver includes means for generating at least one destination direction signal indicative of a bearing from the position of the receiver toward a desired destination, and wherein said display means, in accordance with the destination direction signal, provides a visible image of a rotatable pointer and causes the pointer to point in the direction of the desired destination.

7. Electronic direction finder according to claim 6 which includes means for a user selecting said desired destination to which said rotatable pointer will point.

8. Electronic direction finder according to claim 7 which includes means for entering data defining the location of said desired destination.

9. Electronic direction finder according to claim 8 wherein said navigation receiver comprises a GPS receiver.

10. Electronic direction finder according to claim 9 which includes an antenna switch means for selectively connecting said navigation receiver to each one of said omnidirectional antenna and said directional antenna means.

11. Electronic direction finder according to claim 1 wherein said navigation receiver comprises a GPS receiver.

12. Electronic direction finder according to claim 1 which includes a display means coupled to said navigation receiver for providing, in accordance with said electrical signal, a visual indication of the orientation of said housing axis with respect to said one predetermined compass heading.

13. Electronic direction finder comprising:
a housing having a major axis;
an omnidirectional antenna for receiving signals from at least three satellites;
GPS navigation receiver fixed within said housing and coupled to said omnidirectional antenna for receiving said satellite signals from said omnidirectional antenna and in response thereto determining the position of the receiver and also determining the position of at least one of the satellites;
directional antenna means, having a directional antenna pattern, fixed to and rotatable with said navigation receiver for also providing said satellite signals to said receiver;
direction means for determining when said directional antenna pattern is oriented at a predetermined direction with respect to said at least one satellite;
means for providing an electrical signal indicative of the direction of said housing axis with respect to at least one predetermined compass heading when said directional antenna is oriented at said predetermined direction by using the determined positions of said at least one satellite and of said receiver to calculate a bearing from said receiver to said at least one satellite; and
display means coupled to said navigation receiver for providing, in accordance with said electrical signal, a visual indication of the orientation of said housing axis with respect to said one predetermined compass heading.

14. Electronic direction finder according to claim 13 wherein said GPS navigation receiver includes means for generating at least one destination direction signal indicative of a bearing from the position of the receiver toward a desired destination, and wherein said display means, in accordance with the destination direction signal, provides a visible image of a rotatable pointer and causes the pointer to point in the direction of the desired destination.

15. Electronic direction finder according to claim 14 which includes means for a user of said electronic direction finder manually selecting said desired destination.

16. Electronic direction finder comprising:
a housing having a major axis;
an omnidirectional antenna for receiving signals from at least three satellites;
GPS navigation receiver fixed within said housing and coupled to said omnidirectional antenna for receiving said satellite signals from said omnidirectional antenna and in response thereto determining the position of the receiver and also determining the position of at least one of the satellites;
directional antenna means, having a directional antenna pattern, fixed to and rotatable with said navigation receiver for also providing said satellite signals to said receiver;
direction means for determining when said directional antenna pattern is oriented at a predetermined direction with respect to said at least one satellite; and
means for providing an electrical signal indicative of the direction of said receiver axis with respect to at least one predetermined compass heading when said directional antenna is oriented at said predetermined direction by using the determined positions of said at least one satellite and of said receiver to calculate a bearing from said receiver to said at least one satellite;
wherein said directional antenna pattern has at least one narrow band null and wherein said direction means determines when said narrow band null is directed towards said at least one satellite, wherein said navigation receiver is dimension so as to be hand holdable, and wherein said navigation receiver includes display means for providing a visual indication indicative of when said housing axis is oriented at said predetermined direction with respect to said at least one satellite.

17. An electronic direction finder according to claim 16 which includes a display means coupled to said navigation receiver for providing, in accordance with said electrical signal, a visual indication of the orientation of said housing axis with respect to said one predetermined compass heading.

18. An electronic direction finder according to claim 17 wherein said navigation receiver includes means for generating at least one destination direction signal indicative of a bearing from the position of the receiver toward a desired destination, and wherein said display means, in accordance with the destination direction signal, provides a visible image of a rotatable pointer and causes the pointer to point in the direction of the desired destination.

19. An electronic direction finder according to claim 18 wherein said display means provides a visual display of said one predetermined compass heading at a location indicative of the difference between said one compass heading and said housing axis.

20. An electronic direction finder according to claim 19 which includes means for a user selecting any of a plurality of destinations as said desired destination to which said rotatable pointer will point and which includes means for entering data defining the location of said desired destination.

* * * * *